J. H. HALL.
SAFETY DEVICE FOR ELECTRIC HOISTS.
APPLICATION FILED MAR. 18, 1910.
1,027,126.
Patented May 21, 1912.
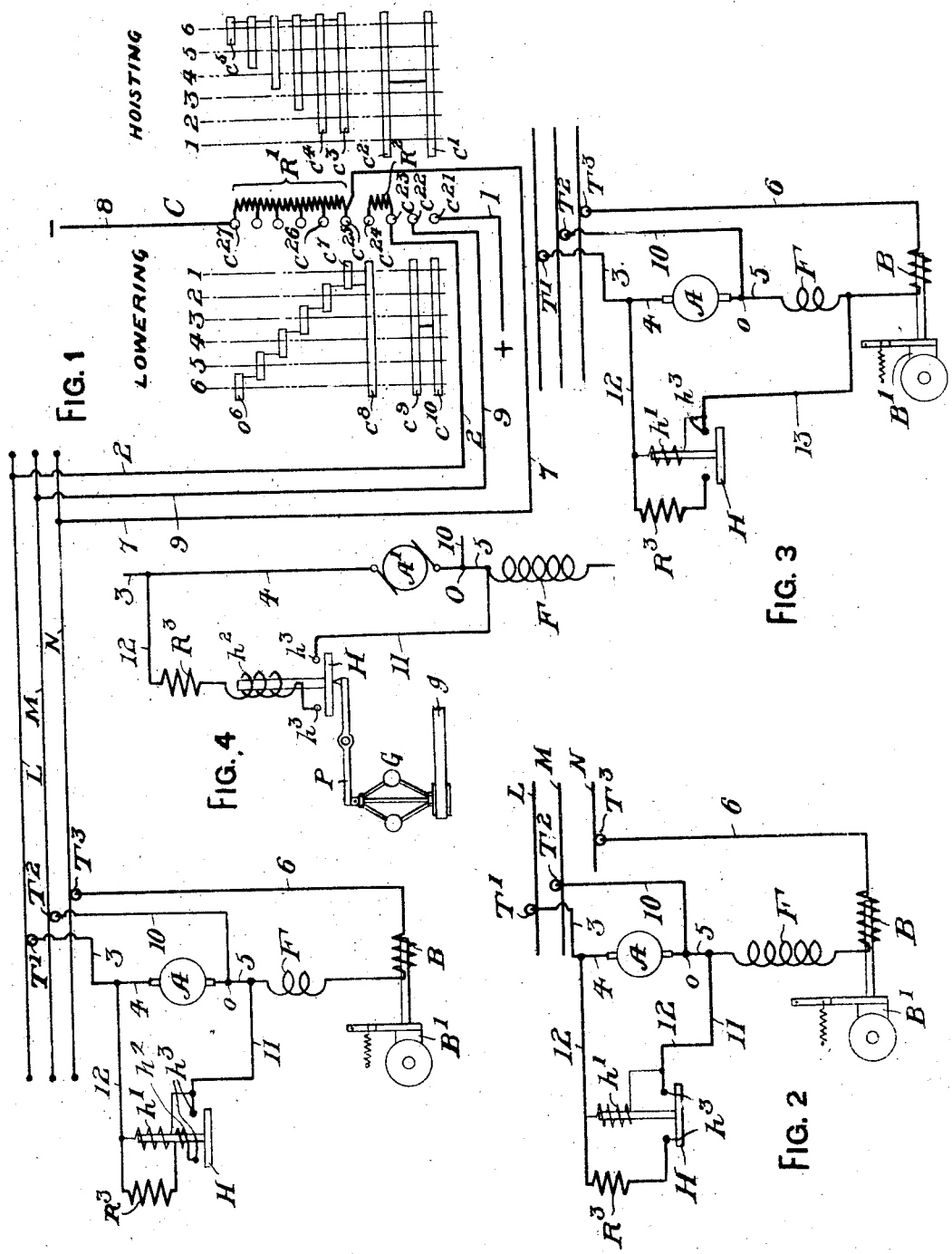

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

SAFETY DEVICE FOR ELECTRIC HOISTS.

1,027,126.  Specification of Letters Patent.  Patented May 21, 1912.

Application filed March 18, 1910. Serial No. 550,145.

*To all whom it may concern:*

Be it known that I, JAY H. HALL, a citizen of the United States, residing at Cleveland, in the county of Cuyahoga and State of Ohio, have invented or discovered new and useful Improvements in Safety Devices for Electric Hoists, of which the following is a specification.

My invention relates to safety devices designed for use in connection with electric hoisting apparatus, particularly that type of apparatus in which the motor operates with its field separately excited, that is, excited by a current not flowing through the armature in series with the field.

A motor with a shunt field always operates with its shunt field separately excited, but a series wound motor may be connected so that its series field is separately excited during certain portions of its operation by being connected in series with a resistance across the source of supply. While my invention can be applied to a shunt-wound motor, I will describe it in connection with a motor having its series field separately excited under certain conditions.

An electric hoist, one type of which is the overhead traveling crane, is often called upon to raise and lower loads ranging over wide limits, from very light loads which will not overcome the running friction of the hoisting mechanism and require power to be applied to the motor to drive them down, to heavy loads up to the capacity of the hoist, which must be prevented from too rapid a descent by the application of some braking force.

My invention is applicable to such hoists as use the motor to supply this braking force. Such loads as will overhaul the hoisting mechanism are allowed to drive the motor as a generator, generating current which is dissipated in a resistance or returned to the source of supply. Such a system depends for safety upon the integrity of the motor connections and circuits; for, if the armature circuit is open for any reason, the braking force is removed and the load will descend under the action of gravity at a speed which may cause the bursting of the armature.

The object of my invention is to prevent the armature of a motor operating under such condition from attaining too high a speed when lowering the load.

Referring to the accompanying drawings, Figure 1 is a diagrammatical representation of a motor control system embodying one form of my invention; Fig. 2, a diagram of a modification of the safety device shown on Fig. 1; Fig. 3, a diagram of a second modification; and Fig. 4, a diagram showing one form of mechanical closer for the safety switch H.

On the drawings, Fig. 1, C is a controller used in connection with the resistances $R'$ and $R^2$. The motor with the armature A and the series field F is arranged to be movable with respect to the controller C, and to be connected to the controller by means of the trolley wires L, M, and N, the connection to the trolley wires being made through the trolley wheels $T'$, $T^2$, and $T^3$, respectively. Traveling with the motor are also the friction brake $B'$ with the winding B, the safety switch H, and the resistance $R^3$.

To hoist the load, the operator moves the controller to the first position in the "hoisting" direction, at which time the following circuit is established: from the positive through the wire 1, the finger $c^{21}$, the contact $c'$, the contact $c^2$, the finger $c^{23}$, the wire 2, the trolley-wire L, the trolley-wheel $T'$, the wires 3 and 4, the armature A, the wire 5, the series field F, the brake winding B, the wire 6, the trolley-wheel $T^3$, the trolley-wire N, the wire 7, the finger $c^{25}$, the resistance $R'$, and the wire 8 to the negative. This circuit connects the armature and the field across the line in series with the resistance $R'$ in such a manner as to cause the motor to hoist the load. As soon as this circuit is established, the brake winding B being energized releases the brake allowing the motor and the hoisting mechanism to rotate. Since the resistance $R'$ is in series with the motor, the latter will operate at its slowest speed. In order to increase the speed of the motor, the operator moves the controller to the succeeding positions in the "hoisting" direction, thereby, in a manner well known, cutting out portions of the resistance $R'$ until the position 6 is reached, at which time all the resistance is cut out and the motor is connected directly across the line, the circuit then being as follows: from the positive through the wire 1, the finger $c^{21}$, the contact $c'$, the contact $c^2$, the finger $c^{23}$, the wire 2, the trolley-wire L, the trolley-wheel $T'$, the wires 3 and 4, the armature A, the wire 5, the series field F, the brake winding B, the wire 6, the trolley-wheel $T^3$, the trolley-wire N, the wire 7, the finger $c^{25}$, the contact $c^3$, the cross connection to the contact $c^5$, the finger $c^{27}$, and the wire 8 to the negative. The motor now runs at its maximum rate of speed in hoisting, the speed depending upon the load. To stop the motor, the controller handle is moved to the off-position (that position shown on Fig. 1), which causes the resistance R' to be gradually inserted in series with the motor until the off-position is reached, when the motor circuit is opened and the brake winding B deënergized, allowing the brake to set, stop, and hold the load.

To lower the load, the operator moves the controller to the first position in the "lowering" direction, thereby establishing the following motor circuit: from the positive through the wire 1, the finger $c^{21}$, the contact $c^{10}$, the contact $c^9$, the finger $c^{22}$, the wire 9, the trolley wire M, the trolley-wheel $T^2$, and the wire 10 to the point O, where the current divides in two parallel paths through the armature and series field of the motor, the path through the field being through the wire 5, the series field F, the brake winding B, the wire 6, the trolley-wheel $T^3$, the trolley-wire N, and the wire 7 to the finger $c^{25}$. Here this circuit is joined by the other parallel circuit through the armature, which passes from the point O through the armature in a direction opposite to that while in hoisting, thence through the wires 4 and 3, the trolley-wheel T', the trolley-wire L, the wire 2, the finger $c^{23}$, the resistance $R^2$, the finger $c^{24}$, the contact $c^8$, the contact $c^7$, and the finger $c^{25}$, where it joins the said circuit through the field, and the circuit is completed through the resistance R' and the wire 8 to the negative. The motor will, therefore, run in a direction opposite to that in hoisting because the current through the field is the same as that in hoisting and the current through the armature has been reversed. The resistance $R^2$ is placed in the armature branch of the circuit to balance the resistance of the field and brake windings and cause sufficient current to flow through the field branch of the circuit to energize the brake winding sufficiently to release the brake, and to sufficiently energize the field F to produce the necessary torque in the motor to operate the hoisting mechanism. As the controller is moved farther in the "lowering" position, the resistance R' remains in the field branch of the circuit and is gradually cut out of the armature branch of the circuit until the position 6 is reached, at which time the armature is connected directly across the line, having in its circuit only the resistance $R^2$. If the load on the hoist is so small that it will not overcome the friction of the hoisting mechanism, current will flow through the armature from the positive source of supply to the negative in the direction indicated above, and in position 6 of the controller the armature will operate at its full speed since the field is fully energized, being connected across the line in series with the resistance R', and the armature is connected across the line in series with the small resistance $R^2$. If the load on the hoisting mechanism is great enough to overhaul the same, it will drive the motor as a generator and cause the current to be reversed in its direction through the armature and to flow back into the line in a direction opposite to that detailed in the above description, and the armature acting under the influence of the fully excited field F will act as a dynamic brake to prevent the load from descending at too great a speed.

I will now describe the operation of the safety switch H. This switch has a solenoid winding h' which is connected to the terminals of the motor armature through the wires 12 and 4 and the wires 11 and 5. This winding is so designed that it will cause the switch to close its contacts $h^3$ only when a voltage exceeding the voltage of the source of supply is applied to its terminals. After the switch has closed, this winding will then hold the switch closed until a very low voltage is applied. The resistance $R^3$ is connected as a shunt across the motor armature through the contacts $h^3$ of the switch H. While lowering a light load the armature will receive current from the source of supply through the resistance $R^2$, and the voltage across the terminals of the armature will always be less than that across the source of supply. When the motor is lowering a heavy load the voltage across the armature due to the motor acting as a generator may be in excess of the voltage across the source of supply, this excess amounting to the voltage required to force the armature current through the resistance $R^2$. Since the maximum load for which the hoist mechanism is designed will produce a certain maximum current through the armature due to the characteristics of a series wound motor, and since the resistance $R^2$ is known, this excess voltage can be determined and will always be the same for any given hoisting mechanism. If now the switch H is so designed that the solenoid winding h' will not operate the switch until a voltage is applied to its terminals amounting to the back E. M. F. of the armature when it is generating this maximum excess voltage, the switch H will not close during the normal operation of the motor. If for any reason the armature should gain a speed higher than the speed under which it operates the heaviest load, caused by the operator attempting to lower a load greater than that for which the hoisting mechanism was designed, the switch H will close and cause the armature to be shunted from the point O through the wire 11, the contacts $h^3$, the resistance $R^3$, and the wires 12 and 4 back to the armature. This shunt on the armature will cause it to operate at a slow speed, the speed depending upon the value of the resistance $R^3$. As soon as the switch H closes, the solenoid winding $h'$ becomes connected across the resistance $R^3$ and the voltage drop across this resistance will depend upon the current flowing through the resistance $R^3$, which in turn depends upon the load which is driving the motor as a generator. The current which will flow through this resistance can be determined for any load which will overhaul the hoisting mechanism at a dangerous speed up to the maximum capacity of the mechanism. The solenoid $h'$ can therefore be designed to hold the switch closed on the smallest current which will flow through the resistance $R^3$. It will thus be seen that the switch H acts as a safety speed limit which will automatically cause the motor to be slowed down before it reaches a speed which will burst the armature binding wires or throw out the commutator bars.

It sometimes occurs with hoists of this kind that the trolley wires will be broken from various causes, or that the trolley wheels will become disconnected from the wires. If the trolley wire M should break or any of the connections thereto fail, the connection to the positive source of supply will be opened, which will open the circuit through the series field F and the brake winding B, thus allowing the brake to set and stop and hold the load. For the same reason, the brake will stop and hold the load in the event that the trolley wire N or any of its connections should fail. If the trolley wire L should fail, however, a circuit is maintained from the positive through the field F, the brake winding B, and the resistance $R'$ to the negative. The dynamic braking circuit through the armature would be broken at the point of failure in the wire L, and since the brake winding holds the brake in the released position, a heavy load would tend to drive the motor in the down direction. Since the armature is revolving under the influence of a full field excitation, it will generate a voltage depending upon its speed and as soon as the speed is reached at which the switch H is designed to close, this switch will close and connect the armature in a dynamic braking circuit through the resistance $R^3$ as above described. If the operator should fail to move the controller to the off-position, the armature will continue to operate at a safe slow speed until the load has reached the ground, and will deposit it there without causing any damage to the load or to the hoisting mechanism. It is thus seen that the switch H prevents the motor attaining a speed above a certain safe limit from any cause due to too heavy a loading of the hoisting mechanism, or to the failure of any of the motor circuits while operating in the lowering direction. It is plainly seen that, if the motor is operating in the hoisting direction, and any of the motor circuits should fail, the action of gravity on the load will cause it to stop, and the brake winding B will be deënergized and allow the brake to set and hold the load.

In Fig. 2 I have shown the switch H with two windings, viz., a shunt winding $h'$ connected across the terminals of the armature, and a series winding $h^2$ connected in series with the circuit through the resistance $R^3$. The winding $h'$ is designed, as in the switch shown in Fig. 1, to close the switch H when the maximum safety speed of the motor has been reached. As soon as the switch closes its contacts $h^3$ the circuit is established through the resistance $R^3$ and the coil $h^2$, and this coil will assist in holding the switch closed so long as a current flows in this dynamic braking circuit.

In Fig. 3, I have shown the shunt coil $h'$ connected to include the series field F instead of the wire 11.

I have described the operation of my invention in connection only with a manually operated controller, but it can obviously be applied to any control system in which the safety of operation depends upon a dynamic braking force generated by the motor as a generator.

In addition to the application of my invention as above described, it can obviously be applied to a generator, since my invention is shown to operate when a motor is acting as a generator. In case the speed of the generator becomes higher than a predetermined speed, the voltage of the armature will increase proportionately, and when a certain voltage has been reached the safety switch will close, shunting the armature with the resistance $R^3$, thereby increasing the load on the generator, preventing it from attaining too high a speed. This resistance could be so proportioned that it would prevent the generator driving power from driving it at a dangerous speed under maximum driving conditions. The generator would be called upon to carry a certain overload at this time, but the liberal designs of present commercial machines would allow for the generator carrying this overload for the short period of time elapsing before the attendant in the power house could shut off the driving power.

To illustrate how the speed of a generator can be prevented from attaining too great a speed, I have prepared Fig. 4, in which the generator armature A' (which may be a motor armature generating current as hereinbefore described), is shown taking the place of the motor armature A in Fig. 2, and the winding h' of Fig. 2 is omitted. The switch H is located over one end of the first class lever P, the remaining end of the lever being connected to the vertically-slidable upper end of the links of the well-known ball-governor G. The non-traveling lower end of the governor G is driven by the belt g* from some moving part of the armature driving power, as a steam engine. When the armature driving power exceeds a certain speed, the governor G causes the lever P to rock so as to make the switch H engage the contacts $h^3$ and close the armature shunt circuit through the armature A', the wires 5 and 11, the switch H, the resistance $R^3$, and the wires 12 and 4 back to the armature. This shunt circuit increases the load on the armature, thereby slowing down the driving power. This circuit includes therein the winding $h^2$ of the switch which winding retains the switch closed so long as sufficient current flows therein for the purpose. When the current becomes too weak for the winding $h^2$ to retain the switch H closed, the switch drops by gravity or other power and opens the armature shunt circuit. Preferably the lever P is not connected to the switch so that the former may retire from the latter without unseating the switch.

In those claims in which the armature is required to be in a local circuit, it is not intended thereby positively to exclude the field from the said local circuit, as the language of such claims is sufficiently comprehensive to cover the local circuit with or without the field.

I do not limit my invention to series wound motors or brakes, nor to any definite type of controller, nor to other details and combinations thereof unless required by the prior art or by language in the claims which permits of no other construction.

I claim—

1. In a motor control system, a motor, a switch connecting the armature to a source of supply, a permanently closed shunt around the motor armature including a winding, an open shunt around the armature, and a switch acted upon by the winding to close the open shunt whenever the circuit through the armature is disconnected from the source of supply while the first-named switch remains closed.

2. In a motor control system, a motor, a switch connecting the armature to a source of supply, a permanently closed shunt around the motor armature including a winding, an open shunt including a resistance around the armature, and an automatic switch acted upon by the winding to close the open shunt whenever the circuit through the armature is disconnected from the source of supply while the first-named switch remains closed.

3. In a motor control system, an electric motor, a permanently closed shunt around the armature, a winding in the shunt, a second shunt around the armature having therein normally open switch contacts, and a movable switch contact controlled by the winding and arranged to engage the said open contacts whenever the current in the closed shunt rises above a predetermined value.

4. In a safety device for dynamo electric machines, a switch whose contacts are permanently connected in a shunt around the armature of the machine, a winding in the shunt adapted to hold the switch closed when its contacts are closed, and means for causing said contacts to be electrically connected when the speed of the machine is above a certain value.

5. In a motor control system, an electric motor, a permanently closed shunt around the armature, a winding in the shunt, a second shunt around the armature having therein a pair of normally open contacts, and means controlled by said winding for electrically connecting said contacts whenever the current in the closed shunt rises above a predetermined value.

Signed at Cleveland, O., this 2nd day of March 1910.

JAY H. HALL.

Witnesses:
HENRY L. ASSET,
H. M. DIEMER.

---

Copies of this patent may be obtained for five cents each, by addressing the "Commissioner of Patents, Washington, D. C."